(12) United States Patent
Tudela et al.

(10) Patent No.: US 6,627,296 B1
(45) Date of Patent: Sep. 30, 2003

(54) ELASTICALLY COLLAPSIBLE RADOME STRUCTURE

(75) Inventors: Mark Tudela, Acworth, GA (US); David H. Mollenhauer, Beavercreek, OH (US); Nicholas J. Pagano, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/517,802

(22) Filed: Mar. 2, 2000

Related U.S. Application Data
(60) Provisional application No. 60/122,699, filed on Mar. 3, 1999.

(51) Int. Cl.$^7$ .............................. B32B 3/28; F41H 5/00
(52) U.S. Cl. ..................... 428/182; 428/192; 428/911; 89/36.01; 89/36.02
(58) Field of Search ................................ 428/182, 178, 428/911, 192; 343/872, 909, 915, 846; 89/36.01, 36.02, 36.04

(56) References Cited

U.S. PATENT DOCUMENTS

| | | | | |
|---|---|---|---|---|
| 2,733,177 A | * | 1/1956 | Meyer | 154/52.5 |
| 3,604,374 A | * | 9/1971 | Matson et al. | 52/618 |
| 5,394,786 A | * | 3/1995 | Gettle et al. | 86/50 |
| 5,517,894 A | * | 5/1996 | Bohne et al. | 89/36.02 |
| 6,083,583 A | * | 7/2000 | Klocek et al. | 428/35 |

OTHER PUBLICATIONS

"Mechanical Property Evaluation of Combat Talon II Radome Material," William Purcell, UDR–TR–96–96 (1995).

"The Use of Impact Force as a Scale Parameter for the Impact Response of Composite Laminates", W.C. Jackson et al, *Journal of Composites Technology & Research*, vol. 15, No. 4, Winter (1992) pp 282–289).

"Buckling Response of Transversely Loaded Composite Shells, Part I: Experiments", M.A. Tudela et al, To Be Presented at *AIAA/ASME/ASCE/AHS/ASC 39th Structures, Structural Dynamics, and Materials Conference*, La Jolla, CA (1998).

* cited by examiner

*Primary Examiner*—Donald J. Loney
(74) *Attorney, Agent, or Firm*—Bobby D. Scearce; Thomas L. Kundert

(57) ABSTRACT

An impact resistant structure is described which comprises a substantially sinusoidally shaped elastically collapsible open-celled fluted layer disposed between but not bonded to constraining layers, whereby in an impact event, the flutes are free to move between the constraining layers and stress concentrations in the collapsing flutes immediately beneath the impacting object are minimized by the absorption of impact forces by neighboring flutes that resiliently collapse in an accordion-like fashion, and return substantially to the original shape after impact without permanent damage to the structure.

4 Claims, 4 Drawing Sheets

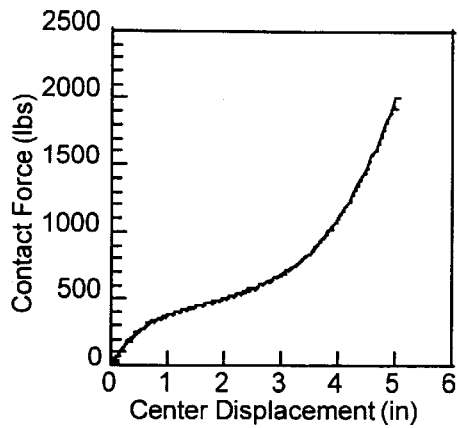
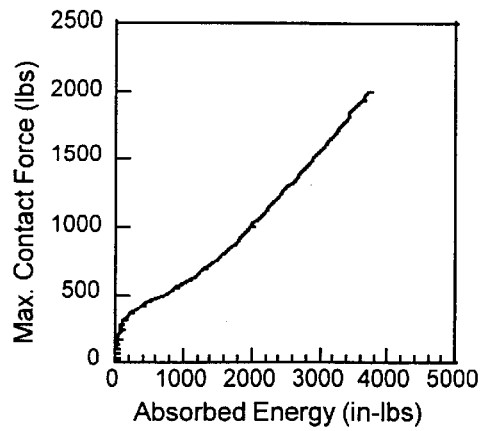
FIG 3a          FIG 3b
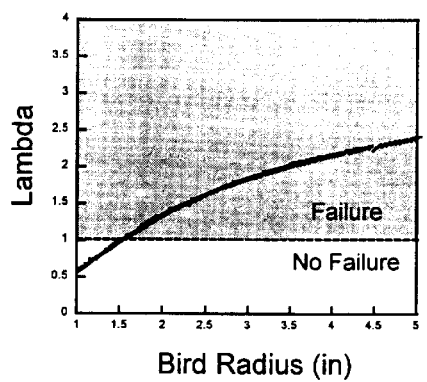
FIG 4

FIG 5a      FIG 5c
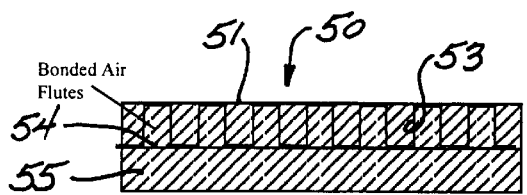
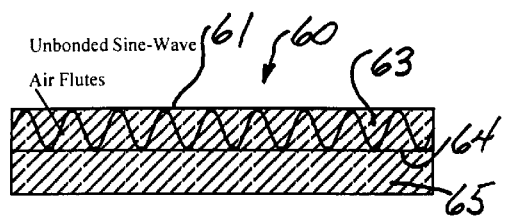
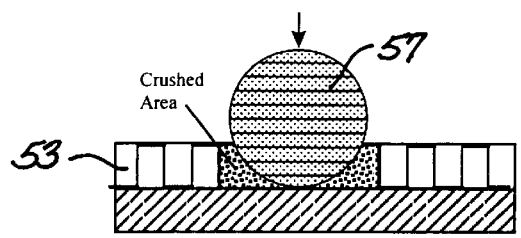
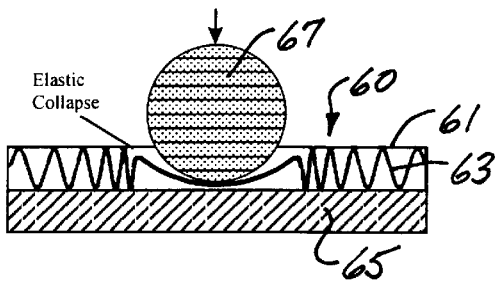
FIG 5b      FIG 5d
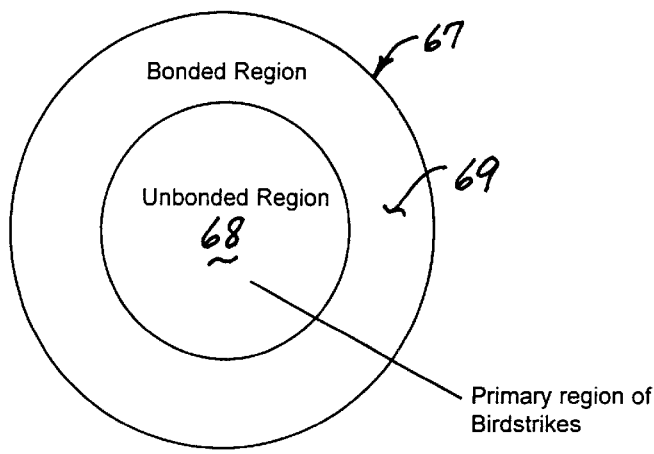
FIG 6

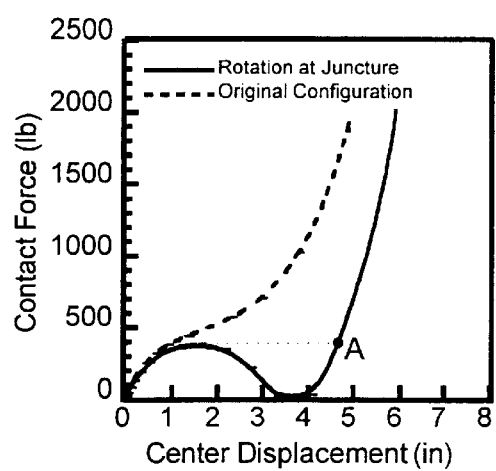 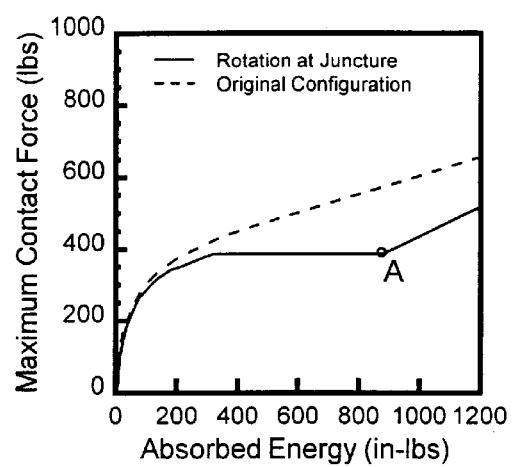
FIG 7a          FIG 7b

ELASTICALLY COLLAPSIBLE RADOME STRUCTURE

The present application claims the benefit of the filing date of Provision Application Ser. No. 06/122,699 filed Mar. 3, 1999, the entire contents of which Provisional Application are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to radome structures or the like typically disposed external of an aircraft that are vulnerable to out of plane loadings, and more particularly to an elastically collapsible, impact resistant sandwich structure for radomes, de-icer elements or the like.

Radome structures are typically mounted to the nose of an aircraft and are therefore subject to bird strikes in flight. Existing radome structures comprise an astroquartz epoxy structure with layered flute and skin sub-structures, designed primarily for radar performance, with the open flute structures carrying hot air near the outer surface for de-icing purposes. The structure is made by bonding a lower structure to a top-hat-shaped skin and then bonding this intermediate structure to a top skin. This structure undergoes crushing of the open cells when impacted by relatively small objects such as birds in flight. The damage has been considered unavoidable and the structure subsequently repaired or replaced. Electronic performance considerations require that in high-performance radar systems that use de-icing technology energy absorption be accomplished without changing the material or the overall thickness of the structure.

The invention solves or substantially reduces in critical importance problems with prior art structures as just described by providing an elastically collapsible open-celled sandwich structure for radome or similar structures that can absorb without damage the impact of out-of-plane loadings such as bird strikes. The structure of the invention eliminates bonding between the open cells and the outer and central skins to facilitate elastic collapse and includes sine-wave shaped cells to eliminate stress concentrations. During impact, the open cells move independently of the constraining skins, collapse and return to the original shape without permanent structural damage. The invention may be used in substantially any sandwich structure requiring impact resistance.

It is therefore a principal object of the invention to provide an impact resistant, elastically collapsible, open celled sandwich structure.

It is another object of the invention to provide improved radome, de-icer or other like structures for aircraft.

It is a further object of the invention to provide radome, de-icer or similar structures having improved resistance to out-of-plane loadings such as bird strikes.

These and other objects of the invention will become apparent as a detailed description of representative embodiments proceeds.

SUMMARY OF THE INVENTION

In accordance with the foregoing principles and objects of the invention, an impact resistant structure is described that includes a substantially sinusoidally shaped elastically collapsible open-celled fluted layer disposed between but not bonded to constraining layers, whereby in an impact event, the flutes are free to move between the constraining layers and stress concentrations in the collapsing flutes immediately beneath the impacting object are minimized by the absorption of impact forces by neighboring flutes that resiliently collapse in an accordion-like fashion, and return substantially to the original shape after impact without permanent damage to the structure.

DESCRIPTION OF THE DRAWINGS

The invention will be more clearly understood from the following detailed description of representative embodiments thereof read in conjunction with the accompanying drawings wherein:

FIGS. 3a and 3b show, respectively, force deflection and energy absorption curves for an idealized radome structure;

FIG. 4 shows a graph of crushing failure parameter x versus bird radius;

FIGS. 5a and 5b show typical air flute structure and crushing response for conventional radome structures;

FIGS. 5c and 5d show air flute structure and crushing response for radome structures according to the invention;

FIG. 6 is bonding pattern for a radome structure according to the invention; and FIGS. 7a and 7b show, respectively, force deflection and energy absorption curves for a radome structure with an instability according to the invention.

DETAILED DESCRIPTION

Figure 1:
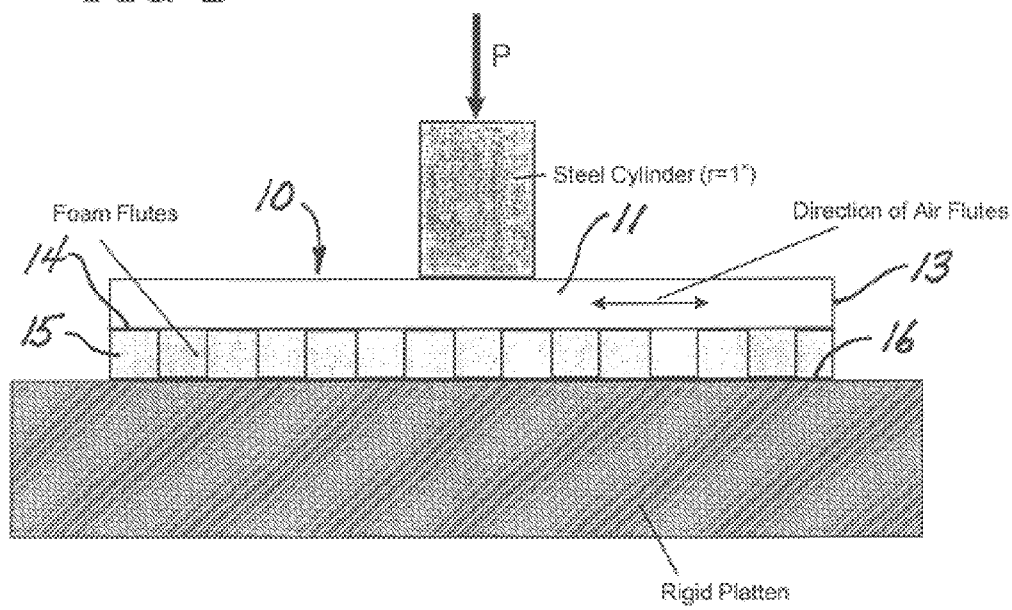
FIG. 1 shows a sectional view of a conventional fluted radome structure disposed in one of several configurations to test failure mechanisms in the conventional structures.

Referring now to the drawings, FIG. 1 shows a sectional view of conventional fluted radome structure 10 disposed in one of several configurations to test failure mechanisms in the conventional structures. Typical conventional radome structures 10 comprise outer surface layer 11 adhered to a rectangularly (usually square) shaped fluted structure 13 layer supported by an inner intermediate constraining layer 14 for carrying hot air for de-icing purposes. A fluted foam layer 15 underlays layer 14 and fluted structure 13, and an inner layer 16 supports layer 15. Typical conventional materials of construction for structure 10 include astroquartz/epoxy, glass/epoxy, fiberglass or any glass-reinforced polymer for layer 11, fluted layer 13, layer 14, or layer 16, and polymer foam, polycell foam or other foam material for fluted foam layer 15. Flute widths in layers 13,15 typically were about 0.3 to 0.5 inch and overall thickness of structure 10 was about 0.3 to 0.4 inch.

Static experiments performed on conventional radome structures such as that suggested in FIG. 1 showed two categories of failure modes for the conventional structure, namely, initial air flute crushing followed by ultimate tension failures on the back face due to global deformations (see Purcell, William, "Mechanical Property Evaluation of Combat Talon II Radome Material," UDR-TR-96-96 (1995), incorporated by reference herein).

Initial failure always occurred in the air-flutes 13. Large impact loadings of sufficient energy would crush the air-flutes first then split the back face. FIG. 1 illustrates a rigid back face test performed with the well-defined contact area of a two-inch diameter cylinder. The cylinder size was chosen so that the contact area is much larger than the characteristic flute width of 0.4 inch. Smaller contact areas give results that are dependent on specific impact location.

The contact stress that could be tolerated by the conventional structure results as, $$\sigma_c = \frac{P_{max}}{\pi 1^2} = 390.8 psi$$

Assuming the bird to be a sphere of radius r and of standard bird density $\rho$, the impact energy of the bird can be written as, $$E = \left(\frac{2\pi}{3}\right)\rho r^3 v^2$$

where v is the impact velocity (aircraft cruising speed). For v equal to 400 ft/sec and $\rho$ equal to 0.012 pounds per cubic inch (Purcell, supra):

$$E = 1499.8 r^3 \text{ in-lbs}$$

where r is in inches. If the bird/sphere contacts the radome uniformly over a circle of radius r, $$P_{crush} = \pi r^2 \sigma_c = 1227.7 r^2 \text{ lbs}$$

Because the impact energy and crushing force are both determinate for a given r, it remains only to find the contact force for a given amount of impact energy. This is accomplished by computing the force-deflection response of the structure and equating the energy of elastic structural deformation to the impact energy. This neglects other energy absorbing mechanisms such as plastic work and fracture since the goal is to have the entire energy absorbed elastically. Then, for a given energy of impact (size of bird, r), the corresponding forces can be computed and compared to the critical value to cause air-flute crushing, $P_{crush}$.

Figure 2:
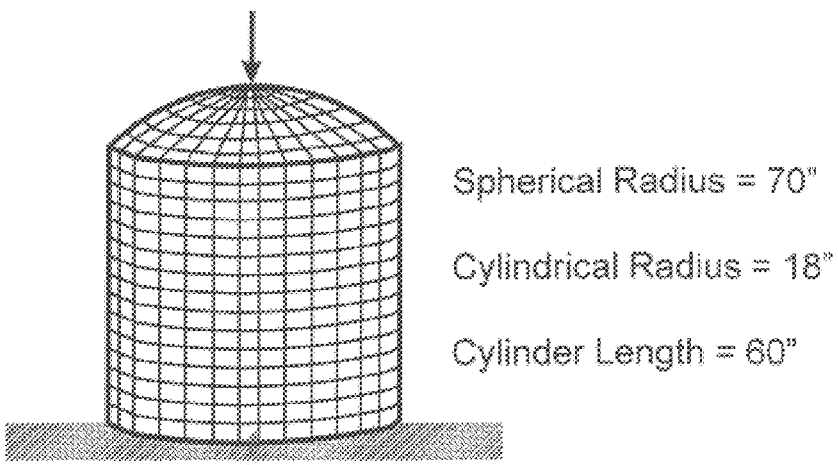
FIG. 2 shows the geometrical and loading configurations of an idealized radome model.

A finite element code specifically designed to analyze shell buckling, Structural Analysis of General Shells (STAGS), was used for this purpose. STAGS was originally developed by NASA, a modified version being used in demonstration of the invention, and is configured to handle large deformations of shell structures such as a radome. A force-deflection response is obtained and the area under this curve represents the energy absorbed through structural deformation. From this the maximum contact force for a given structural configuration can be related to the impact energy. The conventional air/foam flute structure was incorporated into a STAGS analysis using an approximate geometry comprising a cylinder with a spherical cap (FIG. 2). The force-deflection response and the corresponding maximum force versus energy curves are given in FIGS. 3a and 3b.

The relationship between energy and maximum force allows the relationship between maximum force and bird size to be established. A failure criterion for air-flute crushing can now be established by comparing the maximum force with the crushing force $P_{crush}$. If $\lambda$ is the ratio of the maximum force during impact $P_{max}$ to the crushing force $P_{crush}$ then a value of $\lambda$ greater than 1 signifies crushing failure.

if $\lambda = \frac{P_{max}}{P_{crush}}, \lambda \geq 1$ signifies failure

A failure envelope can be generated for $\lambda$ versus bird radius as shown in FIG. 4 for this geometry.

The experimental characterization of flute crushing can only be considered valid for bird diameters greater than the fundamental flute dimension (about 0.4 inch). The minimum bird radius in FIG. 4 was chosen to be one inch (the same area used in the static test). For a desired capability to withstand a bird strike up to a certain bird size, this curve should remain below 1 within this envelope. It is clear from this curve that flute crushing is predicted for bird sizes greater than 1.5 inches, even under the idealized static loading conditions. The inertia effects of the structure would likely increase the contact stresses and cause the entire curve to be in the failure region. In either case, impacts with any reasonable sized birds (4–5 inches) would certainly cause flute crushing failures. This is consistent with the in-service experience and with test results (Purcell, supra). The only design choices available to translate this line below 1 are to increase $P_{crush}$ or decrease $P_{max}$.

Increasing the value of $P_{crush}$ would require a modification of the air/foam flute design such as increasing the material thickness. It is likely that the "crushing" of the outer flutes is initiated by local buckling of the vertical struts. An increase in $P_{crush}$ could then be expected to vary with the cube of the strut thickness, i.e. a doubling of the strut thickness would give an increase in $P_{crush}$ by a factor of 8. However, this would also increase the global stiffness of the radome structure and lead to higher backface stresses. In addition, an increase in flute thickness would likely lead to changes in radar performance.

In accordance then with a principal feature of the structure of the invention, the crushing failure mode is eliminated in a structure wherein the outermost flutes could elastically collapse upon impact, instead of experiencing crushing failure. Accordingly, and in reference now to FIGS. 5a,5b, 5c,5d, shown therein is a comparison of the cross sections of typical air flute structure and crushing response for conventional radome structures (FIGS. 5a,b), and of air flute structure and crushing response for radome structures according to the invention (FIGS. 5c,d).

Accordingly, with reference now to FIG. 5a, the conventional structure 50 includes an outer protective skin layer 51 covering substantially square shaped fluted layer 53 backed by constraining layer 54 and foamed layer 55 as described above in relation to FIG. 1. Layers 51,54 are typically attached to fluted layer 53 using an adhesive, such as FM-300, HYSOL-9394 or any suitable cloth-reinforced film adhesive. Materials of construction for the various layers of structure 50 may be selected as presented above for respective similarly named elements of structure 10 of FIG. 1. When structure 50 is impacted by an object 57, such as a bird, fluted layer 53 is usually substantially and permanently crushed through buckling of the vertical walls of the flutes as suggested in the representation of FIG. 5b.

In accordance then with a governing principle of the invention, underlaying outer protective skin 61 of structure 60 of the invention is a sinusoidally (in cross section) shaped fluted layer 63, as suggested in FIG. 5c. Fluted layer 63 is not bonded to the constraining protective skin 61 or backing layer 64 in any regions of the structure most susceptible to impact from out-of-plane loadings, as discussed more fully below in relation to FIG. 6. The unbonded sinusoidally shaped open cell structure of fluted layer 63 allows the cells (flutes) to resiliently collapse instead of being crushed. The sinusoidally shaped flutes of layer 63 are therefore free to move (slide) between constraining layers 61,64. As suggested in FIG. 5d, when an impact event occurs as by object (bird) 67, stress concentrations in the collapsing flutes immediately beneath impacting object 67 are minimized by the absorption of impact forces by flutes adjacent the impact region that resiliently collapse in an accordion-like fashion.

Materials of construction for the elements of structure 60 may be selected by one skilled in the applicable art guided by these teachings, and are therefore not considered limiting of the invention in its basic structure. Representative composite materials may include those listed above for similarly named elements of the FIG. 1 structure, namely, astroquartz/epoxy, glass/epoxy, fiberglass or any glass-reinforced polymer. Backing layer 65, if included in a structure built in accordance with the invention, may be structured conventionally of materials suggested above for layer 15 of FIG. 1. Overall size of a radome or other impact resistant structure that incorporates the invention is likewise not limiting of the invention and may be selected by the skilled artisan guided by the teachings hereof, in consideration of maintaining stress levels in the structure below fracture levels suggested by the analyses presented or incorporated by reference herein. For example, in a radome structure of size suitable for incorporation onto a large aircraft (of size comparable to the C-130), constraining layers 61,64 of structure 60 may have a thickness in the range of about 0.010 to 0.035 inch (one to three ply material) with a preferred range of about 0.010 to 0.025 inch (one to two ply material). Layer 63 may preferably have material thickness in the range of about 0.010 to 0.015 inch (single ply for resiliency). The sinusoidal flutes of layer 63 may preferably have a range of periodicity of about 0.4 to 0.7 inch with a preferred range of about 0.5 to 0.6 inch. Overall thickness of layer 63 (i.e., between maxima and minima of the sinusoidal shape) may be in the range of 0.10 to 0.20 inch with a preferred range of about 0.14 to 0.16 inch.

In structure 60, the function of the air passages defined by the sinusoidal flutes of layer 63 is not affected as long as contact is maintained between the flutes and the outer protective skin 61.

Computed stresses in the sinusoidal shaped cells under full collapse were shown to remain below fracture levels if the amplitude a and period 1 of the sinusoidal shape is chosen accordingly:

$$\varepsilon_{max} = t\kappa = \frac{tw''}{1 + w'^2{}^{\frac{3}{2}}},$$

$$w = a\sin\left(\frac{\pi x}{l}\right) \Rightarrow w'' = -\frac{a\pi^2}{l^2}\sin\left(\frac{\pi x}{l}\right)$$

$$\varepsilon_{max} = tw''_{max}$$

$$x = l/2 = \frac{ta\pi^2}{l^2}(w' = 0 \text{ at } x = l/2)$$

where primes indicate derivatives. Using the current air flute period, height, and thickness of 0.4 inch, 0.15 inch, and 0.011 inch, respectively, gives a maximum strain of 50,900 $\mu\varepsilon$. The most efficient way to decrease this strain to an acceptable value (Purcell, supra) such as 25,000 $\mu\varepsilon$ would be to increase the period l to about 0.57 inch.

FIG. 6 shows an end view of a radome shape 67 incorporating the novel structure of the invention. As suggested above, it is desirable to incorporate the impact resistant structure of the invention into those regions of radome shape 67 most vulnerable to impact, namely in the nose region 68 (where there is no bonding of the fluted layer), which is preferably much larger in area than a typical bird strike contact area, so that the sinusoidal flutes have sufficient room to resiliently collapse. The surrounding region 69 of radome shape 67 may contain a structure wherein the fluted layer is adhesively bonded between the constraining layers, which may add to the overall structural integrity of overall radome structure 67 without substantially affecting the resiliency of region 68.

The other option to translate the failure curve below the $\lambda=b$ 1line (FIG. 4) is to decrease $P_{max}$, which requires changing the global structural response of the radome shape. Although the collapsible flute design has been shown to eliminate the crushing failure mode, adopting such a global structural approach can further improve the overall impact resistance of the radome structure. The nature of the structural response determines the contact forces and the ability to absorb the kinetic energy of the impact. Peak impact force is widely accepted as a damage metric for low-velocity transverse impact events of structural laminates (Jackson, W. C. and Poe, C. C., Jr., "The Use of Impact Force as a Scale Parameter for the Impact Response of Composite Laminates", *Journal of Composites Technology & Research*, Vol. 15, No. 4, Winter (1992) pp 282–289). As a general rule, the contact forces during impact should be kept to a minimum. The energy of the bird must be absorbed, so the lower contact forces must be accompanied by larger structural deflections. Although plates are rather inefficient structures to generate both low contact forces and large deflections, convex shells, such as the skull cap shape of a radome, are more suited to this task (Wardle, B. L. and Lagace, P. A., "Importance of Instability in the Impact Response of Composite Shells", *Proceedings of the AIAA/ASME/ASCE/AHS/ASC 37th Structures, Structural Dynamics, and Materials Conference*, Salt Lake City, Utah (1996) pp 1363–1373; Tudela, M. A, Lagace, P. A., and Wardle, B. L., "Buckling Response of Transversely Loaded Composite Shells, Part I: Experiments", To Be Presented at *AIAA/ASME/ASCE/AHS/ASC 39th Structures, Structural Dynamics, and Materials Conference*, La Jolla, Calif. (1998).

Convex shells have the potential to undergo a snap-through instability or oil-canning. This behavior is characterized by a negative slope for some portions of the force-deflection curve. The instability has been recognized for its ability to absorb impact energy (Wardle and Lagace, supra). However, not all convex shells exhibit this instability. The current radome shape is an example. The behavior is a function both of thickness, geometric parameters and boundary conditions. Increasing the membrane stiffness relative to the bending stiffness will generally increase the likelihood of an instability. The same is true of the boundary conditions. Those which provide stiffened membrane deformation relative to the bending deformation will give rise to an instability. For example, consider what happens when the bending resistance is decreased at the juncture of the cap and the cylindrical body of the radome, i.e. a relative rotation occurs between the two. FIGS. 7a,7b compare the force-deflection and maximum force-energy curves with those of the conventional structure. If the structure is sized to reach the point marked A for the largest impact energy, then the energy absorption is optimized. In the above case, the energy for the shell with the instability is 958 in-lbs and the energy for the original configuration is 221 in-lbs, both for the same contact force of 375 lbs. This means that the modified structure could absorb roughly 5 times as much elastic energy before failing due to flute crushing. Since this analysis focuses on the global energy absorption, as opposed to the local behavior including flute crushing versus collapse, the results are derived without consideration of the collapsible flute design. Therefore, any benefits from the global approach can be considered to complement the benefits derived from the collapsible flute design. The primary drawback to utilizing such a global approach, as indicated in FIGS. 7a and 7b, is that the increase in energy absorption comes at the expense of larger overall deflections. Depending on the specific requirements of each radome structure, this approach may or may not be feasible as a complement to the collapsible flutes.

The entire teachings of all references cited herein are incorporated by reference herein.

The invention therefore provides an improved impact resistant structure for radomes or other structures on aircraft vulnerable to out-of-plane loadings. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

We claim:

1. An impact resistant structure, comprising:
   (a) first and second spaced apart layers;
   (b) a substantially sinusoidally shaped resiliently collapsible third layer disposed between said first and second layers;
   (c) whereby in an impact event against said structure, said third layer resiliently collapses beneath the impact location and the forces of the impact event are absorbed by resilient collapse in accordion-like fashion of the sinusoidal shape of said third layer in a region of said structure surrounding the impact location.

2. The structure of claim 1 wherein said layers comprise a composite material selected from the group consisting of astroquartz/epoxy, glass/epoxy, fiberglass and glass-reinforced polymer.

3. An impact resistant structure, comprising:
   (a) first and second spaced apart layers;
   (b) a substantially sinusoidally shaped resiliently collapsible third layer disposed between said first and second layers;
   (c) whereby in an impact event against said structure, said third layer resiliently collapses beneath the impact location and the forces of the impact event are absorbed by resilient collapse in accordion-like fashion of the sinusoidal shape of said third layer in a region of said structure surrounding the impact location; and
   (d) means for bonding said first and second layers to said third layer in a peripheral region of said structure for providing structural strength to said structure.

4. The structure of claim 3 wherein said layers comprise a composite material selected from the group consisting of astroquartz/epoxy, glass/epoxy, fiberglass and glass-reinforced polymer.

* * * * *